United States Patent
Obori

(10) Patent No.: US 6,818,681 B2
(45) Date of Patent: Nov. 16, 2004

(54) ULTRAVIOLET-CURABLE RESIN COMPOSITION FOR OPTICAL DISCS

(75) Inventor: Tatsuya Obori, Ako (JP)

(73) Assignee: Nagase Chemtex Corporation, Osaka (JP)

(*) Notice: Subject to any disclaimer, the term of this patent is extended or adjusted under 35 U.S.C. 154(b) by 0 days.

(21) Appl. No.: 10/476,116

(22) PCT Filed: Feb. 18, 2003

(86) PCT No.: PCT/JP03/01743
§ 371 (c)(1),
(2), (4) Date: Apr. 6, 2004

(87) PCT Pub. No.: WO03/071530
PCT Pub. Date: Aug. 28, 2003

(65) Prior Publication Data
US 2004/0167302 A1   Aug. 26, 2004

(30) Foreign Application Priority Data
Feb. 22, 2002 (JP) .................. 2002-046320

(51) Int. Cl.$^7$ ............................. C08F 2/46
(52) U.S. Cl. .......... 522/181; 522/182; 522/93; 522/100; 522/170; 428/65.1; 428/913
(58) Field of Search ............. 428/65.1, 913; 522/181, 182, 93, 100, 104, 170

(56) References Cited

U.S. PATENT DOCUMENTS 6,017,603 A * 1/2000 Tokuda et al. ............ 428/64.1

FOREIGN PATENT DOCUMENTS

| JP | 61-221210 | 10/1986 | ......... C08F/220/12 |
|----|-----------|---------|----------------------|
| JP | 62-151413 | 7/1987 | ......... C08F/220/18 |
| JP | 01-121370 | 5/1989 | ............ C09D/3/80 |
| JP | 04-149280 | 5/1992 | ............ C09D/4/02 |
| JP | 04-236211 | 8/1992 | ......... C08F/220/28 |
| JP | 04-288312 | 10/1992 | ......... C08F/220/28 |
| JP | 01-324135 | 11/1992 | ............ G11B/7/24 |
| JP | 05-059139 | 3/1993 | ......... C08F/299/06 |
| JP | 05-125124 | 5/1993 | ......... C08F/220/28 |
| JP | 05-132534 | 5/1993 | ......... C08F/299/06 |
| JP | 05-135405 | 6/1993 | ............ G11B/7/24 |
| JP | 05-140254 | 6/1993 | ......... C08F/299/06 |
| JP | 05-295040 | 11/1993 | ......... C08F/220/30 |
| JP | 06-080902 | 3/1994 | ............ C09D/4/00 |
| JP | 07-053895 | 2/1995 | ............ C09D/4/02 |
| JP | 07-062267 | 3/1995 | ............ C09D/4/02 |
| JP | 10-007751 | 1/1998 | ......... C08F/290/06 |
| JP | 10-046109 | 2/1998 | ............. C09J/4/02 |
| JP | 10-130586 | 5/1998 | ............. C09J/4/00 |
| JP | 10-176018 | 6/1998 | ......... C08F/290/06 |
| JP | 10-182779 | 7/1998 | ............ C08G/18/32 |
| JP | 11-073684 | 3/1999 | ............ G11B/7/24 |
| JP | 11-100419 | 4/1999 | ......... C08F/290/06 |
| JP | 11-193365 | 7/1999 | ............. C09J/4/02 |
| JP | 11-286657 | 10/1999 | ............. C09J/4/02 |
| JP | 2000-026806 | 1/2000 | ............. C09J/4/06 |
| JP | 2000-063766 | 2/2000 | ............. C09J/4/02 |
| JP | 2000-123408 | 4/2000 | ............ G11B/7/24 |
| JP | 2000-159841 | 6/2000 | ......... C08F/220/30 |
| JP | 2000-186253 | 7/2000 | ............. C09J/4/00 |
| JP | 2000-248233 | 9/2000 | ............. C09J/4/00 |
| JP | 2000-319545 | 11/2000 | ............ C09D/4/02 |
| JP | 2000-345111 | 12/2000 | ............. C09J/4/00 |

* cited by examiner

Primary Examiner—Tatyana Zalukaeva
(74) Attorney, Agent, or Firm—David G. Conlin, Esq.; Greg B. Butler; J. Mark Konieezny

(57) ABSTRACT

There is provided an ultraviolet curing resin composition for an optical disk such as to improve the light resistance of reflective thin films made of silver or silver alloy and protect them against corroding and perform a high adhesive strength, in the optical disks. The composition comprises (1) a (meth)acrylate compound having a number average molecular weight of 700 to 3000 derived from epoxy resin, (2) a (meth)acrylate monomer having one or more of unsaturated ethylene groups, and (3) a polymerization initiator, such as 2,2-dimethoxy-2-phenylacetophenone, benzoylethyl ether and benzoylisobutyl ether, represented in the following general formula (I). Also, a tetrazole derivative may be additionally mixed into the composition.

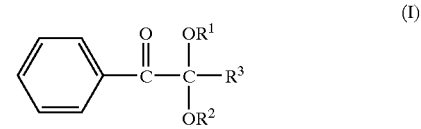

(I)

8 Claims, No Drawings

ULTRAVIOLET-CURABLE RESIN COMPOSITION FOR OPTICAL DISCS

TECHNICAL FIELD

The present invention relates to an ultraviolet curing resin composition for optical disks.

BACKGROUND ART

An optical disk such as CD, CD-R and DVD records information on a transparent substrate thereof such as polycarbonate by pits and lands and forms an information recording layer by providing a reflective film that allows laser beam to bounce off of the surface of pits and lands for reading out the information so as to have one or a plurality of such information recording layers. In optical disks, aluminum, gold, silicon, silicon compounds such as SiC and SiN, or the like have been conventionally formed into thin films by sputtering for being used as the reflective film. Also, in an optical disk of a type such as to have a plurality of information recording layers and read out information in these information recording layers from one side of the optical disk, at least one of reflective layers is formed as a translucent reflective film.

On the other hand, in the optical disk, an ultraviolet curing resin composition is used as a role of protecting the information recording layers for the purpose of performing surface protective coating on the above-mentioned reflective film. Also, in an optical disk of a higher recording density type such that two sheets of substrates are stuck to each other on backsides thereof, namely, so that transparent substrates thereof face outward, an ultraviolet curing resin composition is used for sticking the substrates together.

In the above-mentioned reflective film, thin films made of gold, silicon and silicon compounds have been used for translucent films of DVD requiring the compatibility between high transmittance and reflectance, the problem is that gold costs high while silicon and silicon compounds are troublesome to handle due to easy breaking and cracking and are oxidized in being formed into films so as to contaminate a substrate surface of an optical disk. Accordingly, the use of thin films made of silver or silver alloy in which a slight quantity of gold, palladium, copper and the like are added to silver has been studied as substitutes for the above-mentioned thin films. For example, a reflective film for optical disks comprising silver alloy comprising silver as a major component is disclosed in U.S. Pat. No. 6,007,889.

Silver or the above-mentioned silver alloy, however, has a problem of being essentially inferior in light resistance and not having a sufficient durability due to easy corroding under the conditions of high temperature and high humidity, so that thin films made of silver or the silver alloy are used with difficulty as a reflective film for forming an information recording layer. In order to improve this, for example, a technique is disclosed in Japanese Unexamined Patent Publication No. 2001-167478 for maintaining initial properties by using an adhesive comprising an ultraviolet curing type composition with low water absorption and low moisture permeability for sticking the substrates together.

Conventional techniques, however, offer no solution to a problem such that silver and silver alloy are inferior in light resistance and they also do not necessarily have sufficient adhesive force.

In view of the above-mentioned existing situation, the present invention is intended for providing an ultraviolet curing resin composition such as to improve the light resistance of thin films made of silver or silver alloy and protect them against corroding and perform a high adhesive strength, in an optical disk in which an information recording layer is formed by the thin films made of silver or silver alloy.

DISCLOSURE OF THE INVENTION

The present invention is an ultraviolet curing resin composition for an optical disk in which an information recording layer is formed by thin films made of silver or alloy comprising silver as a major component, the ultraviolet curing resin composition for an optical disk comprising (1) a (meth)acrylate compound having a number average molecular weight of 700 to 3000 derived from epoxy resin, (2) a (meth)acrylate monomer having one or more of unsaturated ethylene groups, and (3) a polymerization initiator represented in the following general formula (I).

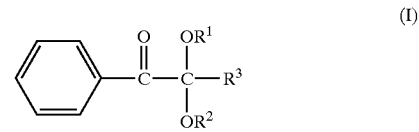

(I)

In the formula, $R^1$ denotes an alkyl group with a carbon number of 1 to 4. $R^2$ denotes a hydrogen atom or an alkyl group with a carbon number of 1 to 4. $R^3$ denotes a phenyl group or an alkyl group with a carbon number of 1 to 4.

In the present invention, the above-mentioned (meth)acrylate compound (1) having a number average molecular weight of 700 to 3000 derived from epoxy resin may be an adduct of ε-caprolactone-modified (meth)acrylate to epichlorohydrin-bisphenol A type (epi-bis type) epoxy resin. Also, in the present invention, a tetrazole derivative may be additionally mixed. The present invention is hereinafter detailed.

DETAILED DESCRIPTION OF THE PREFERRED EMBODIMENTS (1) A (Meth)acrylate Compound Derived from Epoxy Resin The number average molecular weight of the above-mentioned (meth)acrylate compound (1) derived from epoxy resin is 700 to 3000. A number average molecular weight less than 700 weakens adhesive property, while a number average molecular weight more than 3000 deteriorates light resistance and high temperature high humidity resistance. The number average molecular weight is preferably 1000 to 2500. The number average molecular weight could be measured by a method of gel permeation chromatography (GPC).

The above-mentioned (meth)acrylate compound derived from epoxy resin to be used includes, for example, epi-bis type epoxy resin derivative (meth)acrylate having a number average molecular weight of 700 to 3000, which involves epi-bis type diglycidyl ether (meth)acrylate such as bis A diglycidyl ether di(meth)acrylate and bis F diglycidyl ether di(meth)acrylate; an adduct of ε-caprolactone-modified (meth)acrylate to epi-bis type epoxy resin such as an adduct of ε-caprolactone-modified (meth)acrylate to bis A diglycidyl ether (a caprolactone addition molar number of 1 to 10) and an adduct of ε-caprolactone-modified (meth)acrylate to bis F diglycidyl ether (a caprolactone addition molar number of 1 to 10); a combination of two or more of these; and the like.

Among these, an adduct of ε-caprolactone-modified (meth)acrylate to epi-bis type epoxy resin is preferable. Above all, a (meth)acrylate compound represented in the following general formula (II) is more preferable.

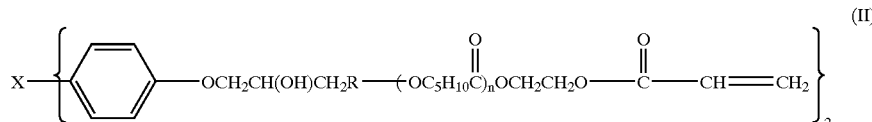

In the formula, X denotes a methylene group, an ethylidene group or an isopropylidene group. R denotes a direct bond or a divalent organic group. n is an integer of 1 to 10, preferably 2 to 6. The above-mentioned divalent organic group may be, for example, a residue derived from divalent carboxylic acid with a carbon number of 2 or more such as a group represented in —OOCACO— (wherein A denotes a direct bond or a diester bond residue of divalent carboxylic acid with a carbon number of 3 or more). Among the above, the divalent carboxylic acid with a carbon number of 3 or more is not particularly restricted and involves malonic acid, succinic acid, adipic acid, maleic acid, itaconic acid, fumaric acid, phthalic acid, terephthalic acid, isophthalic acid, hexahydrophthalic acid, tetrahydrophthalic acid, dimer acid, and the like.

A compound represented in the above-mentioned general formula (II) can be obtained, for example, by a method of reacting ε-caprolactone-modified (meth)acrylate to which 1 to 10 mol of ε-caprolactone is added with epi-bis type epoxy resin.

The quantity of the above-mentioned (meth)acrylate compound (1) derived from epoxy resin to be mixed is preferably 10 to 80 parts by weight in 100 parts by weight of the resin composition, more preferably 30 to 60 parts by weight in consideration of the viscosity of the resin composition to be obtained.

(2) A (Meth)acrylate Monomer Having One or More of Unsaturated Ethylene Groups

The above-mentioned (meth)acrylate monomer having one or more of unsaturated ethylene groups is not particularly restricted and may be one kind or two or more kinds of monofunctional or polyfunctional (meth)acrylate. Examples of the above-mentioned monofunctional or polyfunctional (meth)acrylate are hereinafter listed.

Monofunctional (Meth)acrylate

Monofunctional (meth)acrylate is not particularly restricted and involves isobutyl (meth)acrylate, tert-butyl (meth)acrylate, phenoxyethyl (meth)acrylate, benzyl (meth)acrylate, tetrahydrofurfuryl (meth)acrylate, isooctyl (meth)acrylate, lauryl (meth)acrylate, stearyl (meth)acrylate, isobornyl (meth)acrylate, cyclohexyl (meth)acrylate, 2-hydroxyethyl (meth)acrylate, 2-hydroxypropyl (meth)acrylate, 4-hydroxybutyl (meth)acrylate, 2-methoxyethyl (meth)acrylate, methoxytriethylene glycol (meth)acrylate, 2-ethoxyethyl (meth)acrylate, 3-methoxybutyl (meth)acrylate, ethyl Carbitol™ (meth)acrylate, phenylglycidyl ether (meth)acrylate, 2-hydroxy-3-phenoxypropyl (meth)acrylate, tricyclodecane (meth)acrylate, dicyclopentenyl (meth)acrylate, dicyclopentenyloxymethyl (meth)acrylate, dioxolane-modified (meth)acrylate, and the like.

Difunctional (Meth)acrylate

Difunctional (meth)acrylate is not particularly restricted and involves 1,4-butanediol di(meth)acrylate, 1,5-pentanediol di(meth)acrylate, 1,6-hexanediol di(meth)acrylate, 1,9-nonanediol di(meth)acrylate, 1,12-dodecanediol di(meth)acrylate, neopentyl glycol di(meth)acrylate, (poly)ethylene glycol di(meth)acrylate, (poly)propylene glycol di(meth)acrylate, 2-n-butyl-2-ethyl-1,3-propanediol di(meth)acrylate, bisphenol A ethylene oxide 1 to 4 mol addition-modified di(meth)acrylate, bisphenol A propylene oxide 1 to 4 mol addition-modified di(meth)acrylate, bisphenol F ethylene oxide 1 to 4 mol addition-modified di(meth)acrylate, bisphenol F propylene oxide 1 to 4 mol addition-modified di(meth)acrylate, tricyclodecane di(meth)acrylate, tricyclodecane dimethylol di(meth)acrylate, hydroxypivalic neopentyl glycol di(meth)acrylate, ε-caprolactone-modified hydroxypivalic neopentyl glycol di(meth)acrylate, and the like.

Trifunctional or More (Meth)acrylate

Trifunctional or more (meth)acrylate is not particularly restricted and involves tris((meth)acryloxyethyl) isocyanurate, trimethylol propane tri(meth)acrylate, trimethylol propane ethylene oxide 1 to 4 mol added tri(meth)acrylate, trimethylol propane propylene oxide 1 to 4 mol added tri(meth)acrylate, pentaerythritol tri(meth)acrylate, pentaerythritol tetra(meth)acrylate, glycerin-modified tri(meth)acrylate, dipentaerythritol hexa(meth)acrylate, and the like.

Among these, the following are preferable: tricyclodecane (meth)acrylate, tricyclodecane di(meth)acrylate, tricyclodecane dimethylol di(meth)acrylate, dicyclopentenyl (meth)acrylate, dicyclopentenyloxyethyl (meth)acrylate, isobornyl (meth)acrylate, hydroxypivalic neopentyl glycol di(meth)acrylate, trimethylol propane tri(meth)acrylate, trimethylol propane ethylene oxide 1 to 4 mol added tri(meth)acrylate, pentaerythritol tri(meth)acrylate, pentaerythritol tetra(meth)acrylate. Above all, dicyclopentenyl (meth)acrylate and tricyclodecane dimethylol di(meth)acrylate are more preferable due to a superior curability on a resin surface and an end face of substrates to be stuck together, which are easily affected by oxygen in the air to be hindered from curing.

The quantity of the above-mentioned (meth)acrylate monomer (2) having one or more of unsaturated ethylene groups to be mixed is preferably 20 to 90 parts by weight in 100 parts by weight of the resin composition, more preferably 40 to 70 parts by weight.

(3) A Polymerization Initiator Represented in the General Formula (I)

The above-mentioned polymerization initiator represented in the general formula (I) is not particularly restricted and involves 2,2-dimethoxy-2-phenylacetophenone, benzoylethyl ether, benzoylisobutyl ether, a combination of two or more kinds of these, and the like.

Also, as required, a compound except the above-mentioned polymerization initiator represented in the general formula (I) may be used together therewith; for example, one kind or two or more kinds of a thioxanthone-based compound such as 2,4-diethylthioxanthone and 2-isopropylthioxanthone, an acylphosphine oxide-based compound such as 2,4,6-trimethylbenzoyldiphenylphosphine oxide and bis(2,6-dimethoxybenzoyl)-2,4,4-trimethylpentylphosphine oxide, and the like.

The quantity of the above-mentioned polymerization initiator represented in the general formula (I) to be mixed is preferably 0.2 to 10 part(s) by weight in 100 parts by weight of the resin composition, more preferably 1 to 7 part(s) by weight.

In the case of using the compound except the polymerization initiator represented in the general formula (I), a proper quantity thereof can be mixed within a range of no hindrance to the object of the present invention.

A tetrazole derivative may be mixed as desired into the ultraviolet curing resin composition for an optical disk of the present invention. The above-mentioned tetrazole derivative is not particularly restricted and involves 1-phenyl-5-mercaptotetrazole, 5-aminotetrazole, 1-methyl-5-mercaptotetrazole, 5-phenyltetrazole, 1-(2-dimethylaminoethyl)-5-mercaptotetrazole, a combination of two or more kinds of these, and the like.

The quantity of the above-mentioned tetrazole derivative to be mixed is preferably 0.01 to 1 part by weight in 100 parts by weight of the resin composition, more preferably 0.05 to 0.5 part by weight. The quantity to be mixed more than 1 part by weight brings the possibility of deteriorating storage stability, while the quantity to be mixed less than 0.01 part by weight brings the possibility of insufficiently offering protective performance toward a reflective film made of silver or silver alloy.

Other additives may be mixed as required into the ultraviolet curing resin composition for an optical disk of the present invention. The above-mentioned additives are not particularly restricted and the following may be used in accordance with purposes unless the object of the present invention is hindered, for example, a silane coupling agent such as alkyl-based, thiol-based, (meth)acrylate-based, isocyanate-based, and epoxy-based; a polymerization inhibitor such as methoquinone and methyl hydroquinone; an antioxidant such as hindered phenol, hindered amine, and phosphite; a leveling agent; an antifoaming agent; and the like.

Urethane (meth)acrylate and polyester (meth)acrylate may be mixed into the ultraviolet curing resin composition for an optical disk of the present invention for the purpose of adjusting the properties such as viscosity and hardness unless the object of the present invention is hindered.

The ultraviolet curing resin composition for an optical disk of the present invention can be manufactured by mixing and stirring each of the above-mentioned components at normal temperature to a temperature of approximately 80° C., preferably under a reduced pressure, with the use of an organic solvent or without using it.

The ultraviolet curing resin composition for an optical disk of the present invention can be used appropriately for the optical disk in which an information recording layer is formed by thin films made of silver or alloy comprising silver as a major component. It should be noted that the constitution of the alloy comprising silver as a major component is not particularly restricted in the present specification and includes, for example, alloy comprising silver slightly containing one kind or two or more kinds of gold, copper, rhodium, palladium, magnesium, nickel, aluminum, and the like. The composition of the present invention can be used for the optical disk having thin films made of the above-mentioned components as well as an optical disk having an information recording layer otherwise constituted such as an optical disk in which an information recording layer is formed by thin films made of alloy comprising copper containing silver and thin films not containing silver. Also, raw materials of a substrate applied to the optical disk are not particularly restricted and may be, for example, polycarbonate-based raw material, polyacryl-based raw material, amorphous polyolefin-based raw material, polyvinyl-based raw material, and the like.

EXAMPLES

The present invention is further detailed hereinafter by examples and is not restricted thereto.

Raw materials used in the after-mentioned examples and comparative examples are as follows:

Ebecryl 3708: an adduct of ε-caprolactone-modified acrylate to bis A diglycidyl ether, manufactured by DAICEL UCB Co., Ltd. (a number average molecular weight of 2200, which is measured by a method of GPC with a solvent of tetrahydrofuran, similarly measured hereinafter)

KRM 7856: an adduct of ε-caprolactone-modified acrylate to bis A diglycidyl ether, manufactured by DAICEL UCB Co., Ltd. (a number average molecular weight of 1900)

VR 77: bisphenol A-type epoxy resin diacrylate, manufactured by SHOWA HIGHPOLYMER Co., Ltd. (a number average molecular weight of 800)

KRM 7811: aliphatic urethane diacrylate, manufactured by DAICEL UCB Co., Ltd. (a number average molecular weight of 3500)

FA-511A: dicyclopentenyl acrylate, manufactured by HITACHI CHEMICAL Co., Ltd.

HPP-A: hydroxypivalic neopentyl glycol diacrylate, manufactured by KYOEISHA CHEMICAL Co., Ltd.

DCPA: tricyclodecane dimethylol diacrylate, manufactured by KYOEISHA CHEMICAL Co., Ltd.

IC 651 (the brand name of IRGACURE 651): 2,2-dimethoxy-2-phenylacetophenone, manufactured by CIBA SPECIALTY CHEMICALS Inc.

IC 184 (the brand name of IRGACURE 184): 1-hydroxycyclohexylphenyl ketone, manufactured by CIBA SPECIALTY CHEMICALS Inc.

IC 907 (the brand name of IRGACURE 907): 2-methyl-1-[4-(methylthio)phenyl]-2-morpholino-propane-1-one, manufactured by CIBA SPECIALTY CHEMICALS Inc.

L-TPO (the brand name of LUCIRIN TPO): 2,4,6-trimethylbenzoyldiphenylphosphine oxide, manufactured by BASF Co., Ltd.

MMT: 1-methyl-5-mercaptotetrazole, manufactured by TOYO KASEI KOGYO Co., Ltd.

PMT: 1-phenyl-5-mercaptotetrazole, manufactured by TOYO KASEI KOGYO Co., Ltd.

IBXA: isobornyl acrylate, manufactured by OSAKA ORGANIC CHEMICAL INDUSTRY Ltd.

Examples 1 to 9 and Comparative Examples 1 to 4

Each of the raw materials was measured out into a flask in accordance with the mixtures shown in Table 1 so as to be stirred at a temperature of 60° C. under a reduced pressure for 1 hour and be made into ultraviolet curing resin as uniform transparent liquid at each of the mixtures. It should be noted that the mixtures shown in Table 1 were denoted part(s) by weight.

Two sheets of polycarbonate substrates having a thickness of 0.6 mm were used for optical disks; one of them was a polycarbonate substrate on which a metallic reflective film having a thickness of approximately 15 nm was formed by sputtering silver alloy (the brand name of TTP32A, manufactured by Target Technology Co.), and the other was a polycarbonate substrate on which a metallic reflective film having a thickness of 50 nm was formed by sputtering aluminum.

Approximately 2 g of the ultraviolet curing resin prepared above was applied between the above-mentioned two substrates of disks and extended by a spin coater at a rate of 3700 rpm for 3 seconds, so as to obtain a uniform adhesive layer having a thickness of approximately 40 μm.

Thereafter, the adhesive layer was irradiated with ultraviolet ray having an intensity of 600 mJ/cm$^2$ by a metal halide lamp to be cured, thereby obtaining a disk sample which consists of two substrates bounded together.

Evaluating Methods

The obtained disk samples which consists of two substrates bounded together were evaluated by the following methods. The results are shown together in Table 1.

Evaluation of Adhesive Property

The side of the adhesive layer of the disk samples was cut with a cutter knife to peel away the two sheets of substrates, so that adhesive property was evaluated by a peeling mode at the moment. The standard of evaluation was as follows:

○: Adhesive strength was high and the metallic reflective film was peeled off the substrate.

Δ: The metallic reflective film was peeled off the adhesive layer with difficulty, though.

x: Adhesive force was weak and the metallic reflective film was easily peeled off the adhesive layer.

Evaluation of High Temperature High Humidity Resistance

The optical disks remained untouched under the conditions of an atmosphere having a temperature of 85° C. and a relative humidity of 85% for 240 hours, so that defects such as corrosion and discoloration were observed by an optical microscope. The standard of evaluation was as follows:

○: No change occurred as compared with the initial state.

x: Defects such as discoloration and pinhole occurred as compared with the initial state.

Evaluation of Light Resistance

The optical disks were irradiated by a sunshine weatherometer (a xenon lamp source) for 100 hours, so that the quality of light resistance was determined by the rate of change in the reflectance of the metallic reflective film before and after being irradiated. The standard of evaluation was as follows:

A: The rate of decreases in the reflectance was less than 5%.

B: The rate of decreases in the reflectance was 5% to less than 10%.

C: The rate of decreases in the reflectance was 10% to less than 20%.

D: The rate of decreases in the reflectance was 20% or more.

extremely low results with regard to both of adhesive property and light resistance.

INDUSTRIAL APPLICABILITY

An ultraviolet curing resin composition for an optical disk of the present invention is constituted as described above, so as to vastly improve the light resistance of reflective thin films made of silver or silver alloy as compared with conventional techniques and effectively protect them against corroding. Also, an adhesive layer is flexible and offers a high adhesive strength, leading to a contribution to an improvement in the mechanical strength of optical disks.

What is claimed is:

1. An ultraviolet curing resin composition for an optical disk comprising:

(1) an adduct of ε-caprolactone-modified (meth)acrylate to epi-bis type epoxy resin having a number average molecular weight of 700 to 3000 derived from epoxy resin;

(2) a (meth)acrylate monomer having one or more of unsaturated ethylene groups; and (3) a polymerization initiator represented in the following general formula (I)

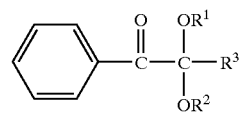

(I)

in the formula, R1 denotes an alkyl group with a carbon number of 1 to 4, $R^2$ denotes a hydrogen atom or an alkyl group with a carbon number of 1 to 4, and R3 denotes a phenyl group or an alkyl group with a carbon number of 1 to 4.

TABLE 1

| | Examples | | | | | | | | | Comparative Examples | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Ebecryl3708 | 50 | 50 | 50 | — | 50 | — | — | 50 | 50 | — | 50 | 50 | — |
| KRM7856 | — | — | — | 50 | — | 50 | — | — | — | — | — | — | 50 |
| VR77 | — | — | — | — | — | — | 50 | — | — | — | — | — | — |
| KRM7811 | — | — | — | — | — | — | — | — | — | 50 | — | — | — |
| FA-511A | 50 | 50 | 50 | 50 | 30 | — | 50 | — | 50 | 50 | — | 50 | — |
| HPP-A | — | — | — | — | — | 50 | — | — | — | — | 50 | — | — |
| DCPA | — | — | — | — | 20 | — | — | — | — | — | — | — | 50 |
| IBXA | — | — | — | — | — | — | — | 50 | — | — | — | — | — |
| IC651 | 3 | 3 | 3 | 3 | 3 | 3 | 3 | 3 | 3 | 3 | — | — | — |
| IC184 | — | — | — | — | — | — | — | — | — | — | 3 | — | 3 |
| IC907 | — | — | — | — | — | — | — | — | — | — | — | 3 | — |
| L-TPO | — | — | — | — | — | — | — | — | 0.2 | — | — | — | — |
| MMT | — | 0.2 | — | 0.2 | 0.2 | 0.2 | — | 0.2 | — | — | — | — | — |
| PMT | — | — | 0.2 | — | — | — | — | — | — | — | — | — | — |
| Adhesive Property | ○ | ○ | ○ | ○ | ○ | ○ | Δ | ○ | ○ | ○ | ○ | ○ | x |
| High Temperature High Humidity Resistance | ○ | ○ | ○ | ○ | ○ | ○ | ○ | ○ | ○ | x | ○ | ○ | ○ |
| Light Resistance | B | A | A | A | A | A | B | A | B | D | D | D | D |

It was understood from the examples that the composition of the present invention sufficiently fulfilled all performances of adhesive property, high temperature high humidity resistance, and light resistance. In contrast, the comparative examples not employing the constitution of the present invention exhibited an extremely low light resistance among the performances. In addition, Comparative Example 4 employing the mixture in conventional techniques exhibited 2. The ultraviolet curing resin composition for an optical disk according to claim 1, wherein a tetrazole derivative is additionally mixed.

3. The ultraviolet curing resin composition for an optical disk according to claim 1, wherein said adduct of ε-caprolactone-modified (meth)acrylate to epi-bis type epoxy resin (1) is a compound represented in the following general formula (II)

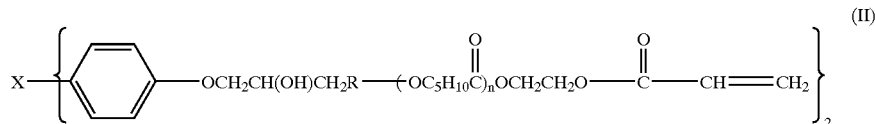

(II)

in the formula, X denotes a methylene group, an ethylidene group or an isopropylidene group, R denotes a direct bond or a divalent organic group, and n is an integer of 1 to 10.

4. The ultraviolet curing resin composition for an optical disk according to claim 1, wherein said (meth)acrylate monomer (2) having one or more of unsaturated ethylene groups is at least one kind selected from the group consisting of dicyclopentenyl (meth)acrylate, tricyclodecane dimethylol di(meth)acrylate, and hydroxypivalic neopentyl glycol di(meth)acrylate.

5. The ultraviolet curing resin composition for an optical disk according to claim 1, wherein said polymerization initiator (3) represented in the general formula (I) is at least one kind selected from the group consisting of 2,2-dimethoxy-2-phenylacetophenone, benzoylethyl ether, and benzoylisobutyl ether.

6. The ultraviolet curing resin composition for an optical disk according to claim 2, wherein the tetrazole derivative is at least one kind selected from the group consisting of 1-phenyl-5-mercaptotetrazole, 5-aminotetrazole, 1-methyl-5-mercaptotetrazole, 5-phenyltetrazole, and 1-(2-dimethylaminoethyl)-5-mercaptotetrazole.

7. The ultraviolet curing resin composition for an optical disk according to claim 2, wherein a quantity of the tetrazole derivative to be mixed is 0.01 to 1 part by weight in 100 parts by weight of the resin composition.

8. The ultraviolet curing resin composition for an optical disk according to claim 1, wherein the ultraviolet curing resin composition for an optical disk is such that an information recording layer is formed by a thin film made of silver or alloy comprising silver as a major component.

* * * * *